United States Patent [19]
Harrison

[11] Patent Number: 5,744,186
[45] Date of Patent: Apr. 28, 1998

[54] METHOD FOR PREPARING ANIMAL FOOD PELLETS

[75] Inventor: Harold Ronald Harrison, Wichita, Kans.

[73] Assignee: Pelleting Concepts International, Inc., Wichita, Kans.

[21] Appl. No.: 760,505

[22] Filed: Dec. 5, 1996

[51] Int. Cl.$^6$ .................... A23L 1/00; A23K 1/00
[52] U.S. Cl. .................... 426/516; 426/447; 426/448; 426/454; 426/511
[58] Field of Search .................... 426/516, 454, 426/447, 448, 511, 805, 807; 264/142; 425/205, 308

[56] References Cited

U.S. PATENT DOCUMENTS

| | | | |
|---|---|---|---|
| 3,438,780 | 4/1969 | Singer | 426/447 |
| 3,574,632 | 4/1971 | Lanz | 426/454 |
| 3,642,489 | 2/1972 | Bartley et al. | 426/516 |
| 3,764,343 | 10/1973 | Paugh | 426/352 |
| 3,886,856 | 6/1975 | Paugh | 99/443 |
| 3,908,034 | 9/1975 | Paugh | 426/449 |
| 3,932,736 | 1/1976 | Zarow et al. | 99/487 |
| 4,001,452 | 1/1977 | Williams | 426/454 |
| 4,028,030 | 6/1977 | Imhof | 425/331 |
| 4,239,500 | 12/1980 | Ratzeburg | 48/202 |
| 4,308,033 | 12/1981 | Gunnerman | 44/6 |
| 4,340,937 | 7/1982 | Volk, Jr. | 364/468 |
| 4,463,430 | 7/1984 | Volk, Jr. et al. | 364/468 |
| 4,700,310 | 10/1987 | Volk, Jr. | 364/468 |
| 4,770,621 | 9/1988 | Groebli et al. | 425/150 |
| 4,874,555 | 10/1989 | Upchurch | 260/412.4 |
| 4,929,163 | 5/1990 | Volk, Jr. | 425/143 |
| 4,983,343 | 1/1991 | Lund | 264/142 |

OTHER PUBLICATIONS

Amandus Kahl Catalog–Annular Gap Expander, dated Dec. 1994.
Jesma–Matador AS Catalog–Feed Processor.
International Journal for the Investigation, Processing and Use of Carbohydrates and their Derivatives, pp.164–167, Attempts for Determining the Degree of Gelatinization in Starchy Materials, May 1994.
Journal of Animal Science, pp. 9–19, Studies on the feasibilty of Predicting Feedlot Peformance from Certain Laboratory Grain Analysis, 1978.
Feed Mix, pp. 32–34, Operation Strategies for Expansion Cooking, 1994; pp. 26–31, Influence of Expansion on Feed Components, 1994.
Feed Production, The Production of Contamination Free Feeds.
Focus, Expanding Utilisation.
Wenge Universal Pellet/Cooker—Wenger Online: http://www.wenger.com.

*Primary Examiner*—George Yeung
*Attorney, Agent, or Firm*—W. Bruce Day

[57] ABSTRACT

A method and pellet mill apparatus for the continuous preparation of improved animal feed pellets cooks a grain mash with steam under superatmospheric pressure which extends through a conditioning chamber within the mill and to an extrusion die to increase conditioning and gelatinization of the mash.

14 Claims, 1 Drawing Sheet

METHOD FOR PREPARING ANIMAL FOOD PELLETS

FIELD OF THE INVENTION

The present invention relates to a novel method and apparatus for the continuous preparation of improved animal feed pellets with steam under superatmospheric pressure.

BACKGROUND OF THE INVENTION

This invention relates to a method and apparatus for the continuous preparation of animal feed pellets and, more particularly, to a method employing a unique pressure cooking process. Various cereal grains, preferably in milled form, plant and animal proteins, roughage products, liquids, and other miscellaneous ingredients have been mixed together and conditioned to form a mash. Most pellet producing processes include a hopper or holding bin containing the mash, a conditioner in which moisture and heat are applied to the mash, and a pellet producing means such as a roller and die apparatus into which the mash is fed from the conditioner. Means such as paddle conveyors, screw feeders, chutes and the like are employed to move the material from the hopper, through the conditioner and into the die area.

A pellet mill installation is generally in an environment with an uncontrolled temperature such that when the mash issues from the conditioning chamber into an atmospheric pressure downspout, the mash approaches ambient temperature which can vary the characteristics of the pellets. Means for supplying and controlling heat, moisture and pressure in the conditioning chamber are also included in most systems. The moisture content may be controlled by adjusting the amount of steam, water, dry heat or some other suitable moisture controlling ingredient. The moisture content of the mash may be automatically set within a prescribed range, and the feed rate of the mash may be automatically controlled in response to the moisture content as taught by Volk U.S. Pat. No. 3,932,736.

Because of the different ingredients and various formulas of animal food, different rates of mash introduction and different amounts of moisture addition are required. Further, when the pelleting mash is conditioned with steam under atmospheric pressure, the different formulations require different temperatures and moisture content for proper conditioning. This results in temperatures of the mash exiting the conditioner varying from 70° F. to 212° F. and an added moisture variation from 0% to 8%.

In the prior art, the die or pellet producing means is operated by motors which may be anywhere from 25 to over 600 horsepower. Extruding the mash through the die is a complex rheological process of deformation and flow conditioned upon stress, strain and time. The load on the die and, thus, the efficiency of the system and the quality of the pellets produced is primarily dependent on two factors: (1) the rate at which the grain mash is fed to the die area; generally, the faster the feed rate, the greater the load, and (2) the composition of the mash, its moisture and temperature content, and the degree of its gelatinization and deaeration.

Improving the starch gelatinization of the mash results in decreased horsepower requirements and other advantages including better pellet quality and increased feed efficiency. However, the conventional pelleting systems, such as that taught by U.S. Pat. No. 4,001,452, are limited in terms of high-intensity conditioning and hence starch gelatinization. As described in E. Heidenreich, *Operation Strategies for Expansion Cooking*, 2(5) Feed Mix 32 (1994), the addition of steam of more than 3% in conventional systems causes problems for the pellet pressing process, and results in an increase in temperature of only approximately 50° C. which is too short-lived to create the desired conditioning effects. Further, in conventional devices, high fat content acts as a barrier to moisture thereby obstructing its diffusion into the mash and resulting in poor pellet quality.

Consequently, as described by Heidenreich, supra, the limited intensity level of conventional pelleting in terms of moisture, temperature and pressure results in problems such as insufficient hygienization (especially for the decontamination of salmonella), inadequate breakdown of antinutritive substances, fines, poor bioavailability of proteins and other nutrients, and a difficulty in manufacturing pellets containing high fat levels.

Due to these shortcomings, expanders, such as those manufactured by Sprout-Matador Co., Inc. of Muncy, Pa. and Amandus Kaul of Hamburg, Germany, have been developed which mechanically stress the mash by shearing and thermally stress the mash by friction and dissipation of the mechanical energy. Use of an expander results in enhanced nutritional value of the feed, hydrolysis of the starch, gelatinization, degradation of antinutritional factors, hygienization, and an overall decrease in bulk density. The net result is increased nutritional and sensoric properties of the feed. Further, the hygienic quality of the feed can be raised to the level of foodstuffs with expanders.

Expanders are incorporated into conventional pelleting machines, typically affixed between the distal end of the conditioning chamber and the die and roller apparatus. The length of a typical expander varies from about 5155 mm to about 8790 mm. The mash entering the expander from the conditioning chamber has a temperature of about 70°–80° C. and a moisture content of about 16–18% and exits the expander at temperatures between about 90° C. and 135° C. Generally, the maximum temperature to which the mash is exposed is about 140° C. as a result of the expander's physical and mechanical construction. However, the active temperature range for most popular types of raw materials is lower. The temperature selected depends on the raw material selected and the desired influence. Too high a temperature can break down valuable amino acids, vitamins, pharmaceutical additives or other components.

At high temperatures, neutral fats or free fatty acids are not damaged. Expansion has a positive effect on the fat quality during storage of the feed because the lipases and lipoxydases that oxidize fats are thermally inactivated. Further, the fat is more bioavailable and accessible for digestive enzymes. According to M. Peisker, *Influence of Expansion of Feed Components*, 2(3) Feed Mix 26 (1994), this improvement in fat digestibility is probably the main reason for an increase in available calories, which can be between 2% and 4% depending on the composition selected.

As discussed in Peisker, supra, the modification of starch during expansion has been examined extensively. Physical changes, or gelatinization, consist of a transfer from a crystalline state to the amorphous state. The expander's shearing force essentially ruptures the starch molecules and tends to cause the feed particles to aggregate into clumps. Gelatinization dramatically improves bioavailability and is generally essential for most animals. For example, gelatinized starch is a more accessible substrate for lactic fermentation in the piglet stomach. Gelatinized starch also enhances pellet quality because of its ability to adhere together and integrate liquids, such as oils, into its pasty structure.

Proteins are temperature sensitive molecules which will, under high temperatures, coagulate or denature. This can be advantageous if the mash, prior to expansion, contains proteins such as enzyme inhibitors, as is possible in the case of peas or insufficiently toasted soybeans. Protein digestibility has been significantly enhanced by use of expanders. Expansion also results in faster glucose influx in the gut after feed consumption. Further, according to Peisker, supra, subjecting the mash to a drastic pressure drop when it leaves the expander results in rupture of cell walls of microorganisms and the grain.

Throughput ranges from between about 1.5 and 30 tons per hour, requiring a total driving power of between 75 and 315 kW per hour. Once the mash exits the expander it is cooled at atmospheric pressure prior to entering the die area where it is extruded into pellets.

As mentioned, the expander is an add-on apparatus that conditions the mash by hydrothermal, pressure and mechanical means. As such, additional costs for the expander, for electrical and hydrothermal energy, and for maintenance are required. The present invention relates to achieving better or similar results in final pellet characteristics as those subjected to the expansion process. The present invention subjects the mash to steam under pressure from the time the mash enters the conditioning chamber until it exits the die as pellets. Applicant is aware of an attempt by Central Soya Co., Inc. of Fort Wayne, Ind. in the late 1970's to make a machine employing pressure all the way through the die area. However, this attempt was unsuccessful and the project and prototype were abandoned after short use.

SUMMARY OF THE INVENTION

Unlike the prior art, the mash of the present invention is conditioned under high temperature and steam pressure of up to about 30 psi and about 260° F. from the time it leaves the variable speed screw feeder until it leaves the extrusion die. An expander is not employed. There is no reduction of pressure between the conditioning and the extrusion steps.

Further, the superatmospheric chamber of the present invention differs from the conventional conditioning chamber in that it is larger to increase the retention time and conditioning. Most importantly, the chamber is designed to withstand high temperatures and pressures, as is the die and roller apparatus.

According to the present invention, the mash passes through the superatmospheric chamber comprised of a conditioner and downspout and is dropped into a final screw conveyor which moves the mash to the die and roller area. The die and roller system differs from the prior art in that the die is stationary and the rolls are turned by the shaft of the final screw conveyor.

Therefore, the following objects are achieved by the present process and apparatus: (a) better or similar results in final pellet characteristics as systems employing expanders; (b) conditioning the mash with steam at high temperature and pressure all the way from the variable speed screw feeder until it leaves the extrusion die; (c) employing a larger superatmospheric chamber designed to increase conditioning time and withstand high temperatures and pressures; (d) employing a pressurized downspout and die and roller apparatus capable of withstanding high temperatures and pressures; (e) employing a roller and die apparatus in which the mash is forced radially through a plurality of orifices of a stationary die by a plurality of rotating rollers; (f) increasing the gelatinization of the mash; (g) increasing digestibility and, thus, improving feeding efficiency; (h) increasing the moisture and conditioning of the mash so the mash packs more readily; (i) decreasing the number of fines in the final product; (j) increasing the amount of urea in the grain thereby decreasing the cost of weight gain of ruminant animals; (k) employing high temperature and moisture levels in the mash to decrease friction and wear at the die; (l) increasing the conditioning and gelatinization of the mash so that ingredients that are hard to pelletize may be used, such as grain, grain by-products, fat, meat, bonemeal, beet pulp and citrus pulp; (m) decreasing energy requirements because of the improved conditioning of the mash; (n) increasing the deaeration and plasticity of the mash; (o) improving the hygienic status of the final product, decreasing the rate of diarrhea and the mortality rate of the stock; (p) employing high temperature and pressure to inactivate salmonella, mycotoxins, karnal bunt, botulism, listeria, e. coli and other microorganisms; (q) improving the bioavailability of the pellets by increasing the level of protein dispersibility and metabolizable energy; (r) increasing the amount of amino acids in the pellets without increasing feed costs; (s) decreasing energy and maintenance requirements, improved operator safety and less noise than the prior art; (t) making the mill easier to operate than a conventional pellet mill; and (u) pelletizing temperature sensitive components in the mash without altering their desirable characteristics.

Other advantages and objects of the invention will become apparent from the following description with reference to the accompanying drawings.

DETAILED DESCRIPTION OF THE PREFERRED EMBODIMENT

Figure 1:
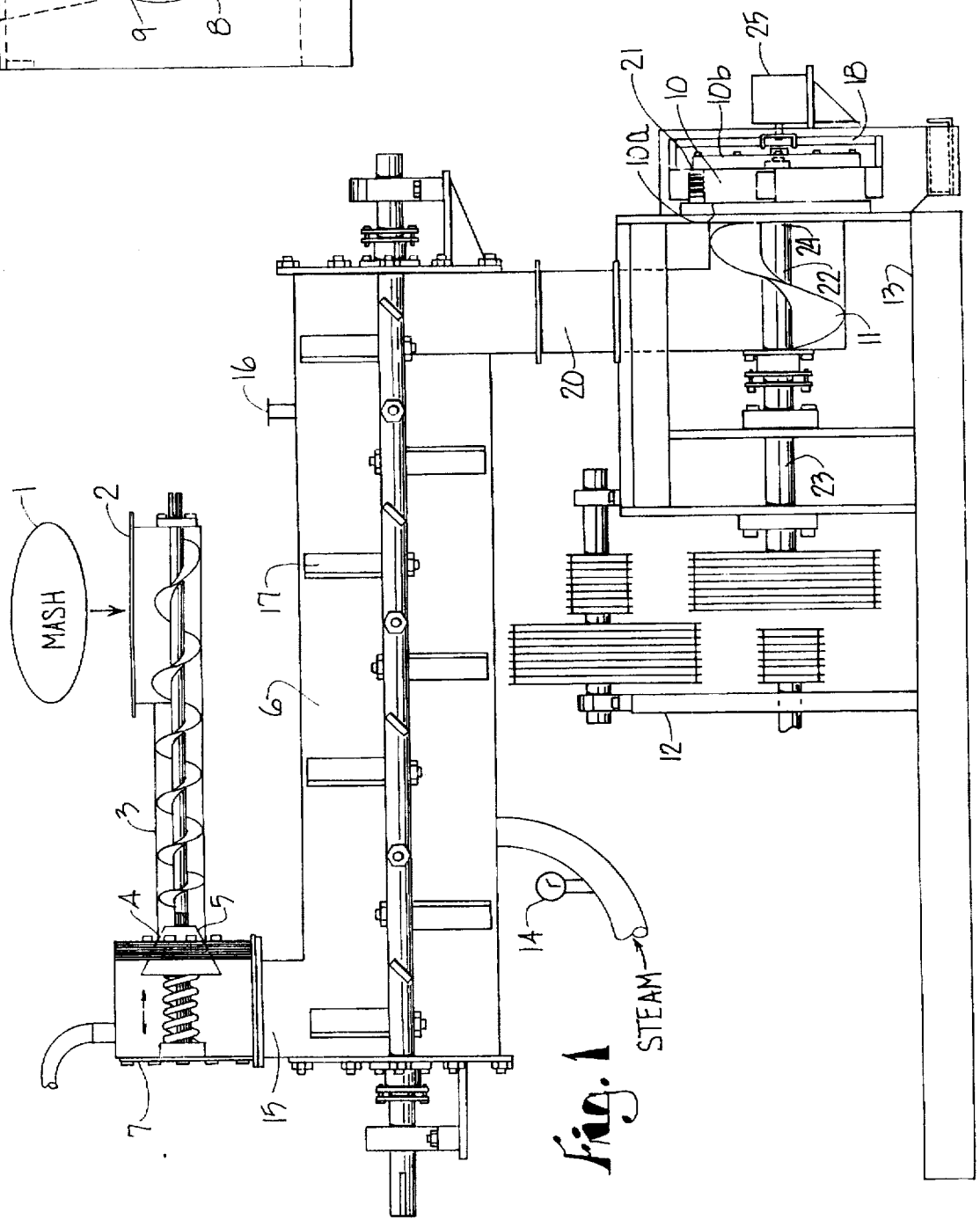
FIG. 1 is an elevational view, partially in section and partially schematic showing the apparatus of the present invention.

As illustrated in FIG. 1, mash 1 is fed through hopper 2 into a variable speed screw feeder 3. Mash 1 may be composed of any materials used in animal feed including, but not limited to, grains, soybeans, meats, meat by-products, fats, vitamins and pharmaceutical agents. The mash 1 is advanced to the left (in FIG. 1) in a plug-type flow caused by a seal member 4. By the variable screw feeder 3 pushing the mash against seal member 4, a solid plug of mash is developed in the seal area 5. The solid plug of mash 1 then presses against seal member 4 and forces the mash through seal area 5 and into a superatmospheric chamber 15. The mash 1 is then conditioned and cooked in the superatmospheric chamber 15, which extends from a seal member 4 at a top end 7 and a die 10 at a bottom end 13. Seal member 4 serves the same utility as the first conical seal taught by U.S. Pat. No. 4,001,452, incorporated herein by reference as if fully set forth. The die 10 functions as a rear seal. Superatmospheric chamber 15 is comprised of a conditioner 6 which extends into a downspout 20. Although conditioner 6 and downspout 20 may be of any shape and size sufficient to achieve the desired results, in an exemplary embodiment, the conditioner 6 is preferably about 8 feet long and about 2 feet in diameter and downspout 20 is preferably about 3½ feet long and about 1½ feet wide. Seal member 4 may be the positionable cone variety as described in detail in U.S. Pat. No. 3,246,594 incorporated herein by reference as if fully set forth, or a flat metal plate or other suitable means to allow the mash into the conditioner 6 while maintaining the pressure within the conditioner 6.

Once the mash 1 particles enter the conditioner 6, the mash 1 particles are subjected to a superatmospheric pressure schematically represented by the introduction of steam. The steam is controlled by a conventional steam pressure regulating valve 14. The pressure remains constant and the flow varies depending on the amount of steam required to sustain the pressure in conditioner 6 and the composition of the mash 1.

The conditioning of the mash 1 is advantageously achieved by steam under pressure of from about 1 psi to about 30 psi and at a temperature from about 212° F. to about 260° F. Consequently, conditioner 6, downspout 20 and the die 10 apparatus must be designed to be capable of withstanding such temperatures and pressures. The pressure, temperature and feed rate are controlled by automated control systems well known in the art. Further, about 1% of water (by the addition of steam) is added for every approximately 20° F. increase in temperature.

By pressure cooking the mash in this fashion, increased gelatinization of the grains in mash 1 occur which has the advantages described above. The residence time in superatmospheric chamber 15 between seals 4 and die 10 is approximately 10 to 60 seconds depending on the composition of the mash. The air that is contained in the mash 1 is forced out of the mash in the superatmospheric chamber 15. Since air is lighter than steam, the air tends to collect at the top of the conditioner 6 and evacuate the steam. If it is not released, it will air lock the superatmospheric chamber 15 and block any further steam flow. This problem is solved by an air vent 16 which will allow the air to be forced out of the superatmospheric chamber 15 on a continuous basis and prevent air lock.

The pressure-cooked mash is transported through the conditioner 6 by a paddle conveyor 17 or other like means, is moved to the downspout 20 and then dropped into a screw conveyor 11 which moves the now soft, sticky, hot and wet mash to the die and roller area. Screw conveyor 11 is preferred although a paddle conveyor or like means could be substituted. Die 10 is circular in shape, has a plurality of orifices 21 and has an inner surface 10a and an outer surface 10b. A plurality of rollers 9, preferably two in number, are located on the inner surface of die 10 and force the mash through orifices 21 to form rods of consolidated material. The die and roller arrangement is similar in structure to conventional arrangements except the die 10 is preferably stationary and the rollers 9 are rotated by the shaft of screw conveyor 11. This allows the steam pressure to be maintained on the mash until it exits the die 10 in the form of the rods.

Figure 2:
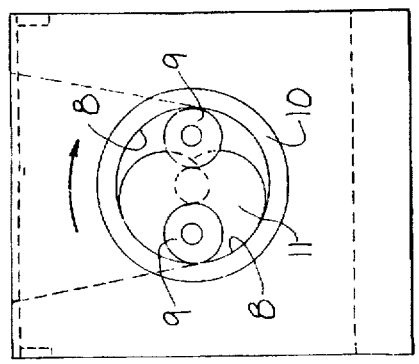
FIG. 2 is a cross-sectional perspective view of the interior of the roller and die apparatus illustrated in the lower right hand portion of FIG. 1.

Referring to FIG. 2, the die, roller and screw conveyor configuration cooperatively functions to strategically place the conditioned mash at a nip 8 so when, for example, die 10 rotates clockwise (illustrated by arrow) the mash is fed by the screw conveyor to nip 8 where it is forced by the rollers through orifices 21 to form the rods. This configuration results in lower energy requirements and decreased wear on the die.

In the preferred embodiment, the screw conveyor 11 and die and roller apparatus are contemporaneously driven by motor 12, which may be from about 30 to 400 horsepower. Screw conveyor 11 comprises a shaft 22 having a first end 23 and a second end 24. The first end 23 is fixedly attached to motor 12 to rotate shaft 22 and the second end 24 is engaged to the rollers 9 to contemporaneously turn rollers 9 when the shaft is rotated. The resulting elongate rods are severed to form discrete pellets by a rotating knife mechanism 18 driven by a separate motor 25 mounted on a door covering the die 10.

The novel die and roller arrangement is beneficial to the pelleting process. It is used to maintain the pressure in the superatmospheric chamber 15. It is believed the pressure all the way to the die 10 assists in forcing the mash through the die 10 and decreases wear and power requirements. Excess steam carried through the die 10 in the mash is released once it reaches the atmospheric pressure outside the die. At the end of the production run, the steam is shut off and the pressure is released by the air vent 16. By placing screw conveyor 11 behind the die 10 and turning it with the same shaft 22 used to turn rollers 9, mash 1 is injected at the point of nip 8 of the die 10 and rollers 9. The increased temperatures of the mash at the die from this arrangement result in reduced power requirements and an increased life of the die 10. Further, this arrangement has, in the inventors' experiments, resulted in as much as a fifty percent (50%) increase in throughput of the mash, depending on its composition. For example, in one such experiment, the mash was pelletized at eight (8) tons per hour whereas in a conventional machine the same mash could only be pelletized at the rate of four (4) tons per hour. Additionally, this arrangement reduces roller slippage.

It should be understood that various changes to the present invention may be made by the ordinarily skilled artisan without departing from the spirit and scope of the present invention which is presented in the claims below. For example, the screw conveyor 11 could be substituted with a paddle conveyor or other like means. The chamber 15 could be configured without a downspout 20 and with the die and roller apparatus connected directly to conditioner 6. Therefore, the ordinarily skilled artisan will understand that this disclosure presents an example of the invention and is not meant to limit the invention as presented in the claims in any way.

What is claimed and desired to be secured by Letters Patent is as follows:

1. A method of preparing animal feed pellets wherein the steps comprise:
   (a) feeding dry mash through a hopper and into a feeder which pushes the mash against a pressure seal;
   (b) conditioning the mash with steam under a superatmospheric pressure in a superatmospheric chamber, said chamber being defined at the ends thereof by said pressure seal at a top end and a circular pellet die at a bottom end, said pressure being maintained throughout the superatmospheric chamber to increase conditioning and gelatinization of the mash;
   (c) extruding radially said mash through a plurality of orifices of said die to form rods; and
   (d) severing transversely the rods to form animal feed pellets.

2. The method of claim 1 wherein said conditioning step is performed by confining the mash in a steam atmosphere in the range of about 1 psi to about 30 psi.

3. The method of claim 1 wherein said conditioning step consists of the mash being subjected to the steam and the pressure for about 10 to about 60 seconds.

4. The method of claim 1 wherein said conditioning step comprises adding about 1% water from steam for about every 20° F. increase in temperature of the mash.

5. The method of claim 1 wherein the temperature of the mash is maintained in the range of about 212° F. to about 260° F. during the conditioning and extrusion steps.

6. The method of claim 1 wherein the moisture content of the mash during the conditioning step is raised by about 9% depending on the ingredients of the mash.

7. The method of claim 1 wherein the circular die is stationary and a plurality of rollers extrude the mash through the orifices.

8. The method of claim 7 wherein the rollers are two in number.

9. A method of preparing animal feed pellets wherein the steps comprise:
  (a) feeding dry mash through a hopper and into a variable speed screw feeder which pushes the mash against a pressure seal, said seal opening to allow the mash to enter a superatmospheric chamber;
  (b) conditioning the mash with steam under a superatmospheric pressure in said chamber, said chamber being defined at the ends thereof by said pressure seal at a top end and a circular, stationary pellet die at a bottom end having an outer surface and an inner surface, said pressure being maintained throughout said chamber to increase conditioning and gelatinization of the mash;
  (c) extruding radially the mash through said die to form rods by conveying the mash to a plurality of rollers located on the inner surface of the die while contemporaneously rotating said rollers to force the mash through the die; and
  (d) severing transversely the rods to form animal feed pellets.

10. The method of claim 9 wherein the mash is conveyed to the plurality of rollers by a screw conveyor.

11. The method of claim 10 wherein said screw conveyor comprises a shaft having a first end and a second end, the first end fixedly attached to a motor to turn said shaft, the second end engaged to the rollers to contemporaneously turn the rollers when the shaft is rotated.

12. The method claim 11 wherein the screw conveyor and rollers are spatially related so that the mash is delivered at the nip of the rollers and the die immediately prior to extrusion.

13. A method of preparing animal feed pellets wherein the steps comprise:
  (a) feeding dry mash through a hopper and into a variable speed screw feeder which forces the mash against a pressure seal, said seal opening to allow the mash to enter a superatmospheric chamber while maintaining the pressure inside the chamber;
  (b) conditioning the mash in said chamber with steam under a pressure of about 1 psi to about 30 psi and at a temperature of about 212° F. to about 260° F.; said chamber being defined by said pressure seal at a top end and a circular, stationary pellet die at a bottom end having an outer surface and an inner surface, said pressure being maintained throughout said chamber to increase conditioning and gelatinization of the mash;
  (c) extruding radially said mash through said die to form rods by conveying the mash to a plurality of rollers located on the inner surface of the die while contemporaneously rotating said rollers to force the mash through the die; and
  (d) severing transversely the rods to form animal feed pellets.

14. The method of claim 13 wherein the mash is conveyed to said rollers by a screw conveyor, said screw conveyor and rollers are spatially related so that the mash is delivered at the nip of the rollers and die immediately prior to extrusion.

\* \* \* \* \*